(12) United States Patent
Gadkaree et al.

(10) Patent No.: US 6,317,528 B1
(45) Date of Patent: Nov. 13, 2001

(54) TEMPERATURE COMPENSATED INTEGRATED PLANAR BRAGG GRATING, AND METHOD OF FORMATION

(75) Inventors: Alka K. Gadkaree; Kishor P. Gadkaree, both of Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/379,436

(22) Filed: Aug. 23, 1999

(51) Int. Cl.$^7$ .................................................. G02B 6/12
(52) U.S. Cl. .................. 385/14; 385/37; 385/131; 385/132; 385/147; 359/900
(58) Field of Search .................. 385/10, 14, 37, 385/129, 130, 131, 132, 147; 359/900

(56) References Cited

U.S. PATENT DOCUMENTS

| | | |
|---|---|---|
| 5,042,898 | 8/1991 | Morey et al. . |
| 5,195,161 | 3/1993 | Adar et al. . |
| 5,367,588 | 11/1994 | Hill et al. . |
| 5,469,520 | 11/1995 | Morey et al. . |
| 5,673,129 | 9/1997 | Mizrahi . |
| 5,694,503 | 12/1997 | Fleming et al. . |
| 5,703,978 | 12/1997 | DiGiovanni et al. . |
| 5,757,540 | 5/1998 | Judkins et al. . |
| 5,817,537 | 10/1998 | Bodere et al. . |
| 5,838,870 | 11/1998 | Soref . |
| 5,841,920 | 11/1998 | Lemaire et al. . |
| 5,892,582 | 4/1999 | Bao et al. . |
| 6,044,189 * | 3/2000 | Miller . |
| 6,087,280 * | 7/2000 | Beall et al. . |
| 6,122,430 * | 9/2000 | Bookbinder et al. ................ 385/137 |

\* cited by examiner

Primary Examiner—Hung N. Ngo
(74) Attorney, Agent, or Firm—Philip G. Alden; Walter M. Douglas

(57) ABSTRACT

An integrated planar Bragg grating is fabricated by depositing layers of material onto a negative expansion substrate to form a waveguide, which is held in mechanical tension with the substrate. A Bragg grating is then formed in the waveguide. As the temperature of the waveguide increases, the mechanical tension between the waveguide and the substrate is relieved, such that the peak reflection wavelength of the Bragg grating remains nearly constant.

41 Claims, 2 Drawing Sheets

TEMPERATURE COMPENSATED INTEGRATED PLANAR BRAGG GRATING, AND METHOD OF FORMATION

BACKGROUND OF THE INVENTION

1. Field of the Invention

The present invention relates generally to integrated optical ("planar") Bragg gratings, and particularly to integrated optical Bragg gratings whose peak reflection wavelength is substantially insensitive to temperature variations.

2. Technical Background

A Bragg grating consists of an optical waveguide defining a pattern or stack of regions having alternating higher and lower refractive indices, so that light within a narrow wavelength band is reflected by the grating, and wavelengths outside the band are transmitted through it. A Bragg grating is an excellent narrow-band optical filter which may have a variety of applications, such as a wavelength multiplexer, a fiber laser mirror, a dispersion control device, or a sensor. For this reason, Bragg gratings are becoming increasingly important in optical communications.

An important characteristic of a Bragg grating is the stability of its peak reflection wavelength with respect to variations in temperature. The peak reflection wavelength of a silica fiber Bragg grating generally increases with temperature by about 10 picometers/° C., unless measures are taken to compensate for this shift. Stress may be used to provide such compensation. The peak reflection wavelength of a silica fiber Bragg grating tends to increase linearly with stress at approximately 0.1 picometers per psi of tensile stress. In order to stabilize the peak reflection wavelength of a fiber Bragg grating over a range of operating temperatures, various methods have been devised to vary the level of stress experienced by the grating as the temperature varies, so that the peak reflection wavelength is substantially temperature insensitive. As a rule of thumb, if the stress on a fiber Bragg grating decreases at a rate of about 120 psi/° C., the grating's peak reflection wavelength will be substantially invariant with respect to temperature.

One way of achieving temperature compensation is to attach a fiber Bragg grating that is under tension to a substrate that has a negative thermal coefficient of expansion. As the temperature increases, the substrate contracts, thereby relieving some of the tension in the grating. When the fiber Bragg grating and the substrate are properly designed, the effect that this reduction in the tension in the grating would have on the peak reflection wavelength is offset by the effect that the increase in temperature would have on the peak reflection wavelength in the absence of any change in tension.

There are several drawbacks to the current technology, however. First, state of the art products are bulky and may need to be housed in a hermetic package to prevent degradation of the substrate and/or the fiber-to-substrate bonds. Secondly, the manufacturing process of current devices is generally complicated and expensive. Thus, there remains a need for a compact fiber Bragg grating that is relatively insensitive to variations in temperature.

SUMMARY OF THE INVENTION

One aspect of the invention comprises a method for forming an integrated Bragg grating that includes providing a negative expansion substrate, forming a waveguide on the substrate by alternately depositing material on the substrate and relieving stress within the deposited material, and forming a Bragg grating in the waveguide. The Bragg grating has a peak reflection wavelength, and the waveguide and the substrate have a coefficient of expansion mismatch that is selected to substantially compensate for shifts in the peak reflection wavelength that would otherwise arise from changes in temperature. The coefficient of expansion mismatch may be advantageously greater than about 4 ppm/° C. The stress may be relieved by annealing the deposited material. In a preferred embodiment, forming a waveguide comprises forming a cladding layer on the substrate by alternately depositing a first material on the substrate and annealing the first material, and forming a core layer on the cladding layer by alternately depositing a second material on the cladding layer and annealing the second material, wherein the core layer has an index of refraction that is higher than the index of refraction of the cladding layer.

According to another aspect of the invention, an integrated planar Bragg grating comprises a negative expansion substrate and a planar waveguide having a Bragg grating therein. The Bragg grating has a peak reflection wavelength, in which the waveguide overlies and is in mechanical tension with the substrate. The coefficient of expansion mismatch between the planar waveguide and the substrate is greater than about 4 ppm/° C., and is selected to substantially compensate for shifts in the peak reflection wavelength arising from changes in temperature. In one preferred embodiment, the planar waveguide includes a cladding layer that overlies the substrate; and a core layer adjoining the cladding layer, in which the core layer has an index of refraction that is higher than the index of refraction of the cladding layer.

DETAILED DESCRIPTION OF THE PREFERRED EMBODIMENTS

Figure 1:
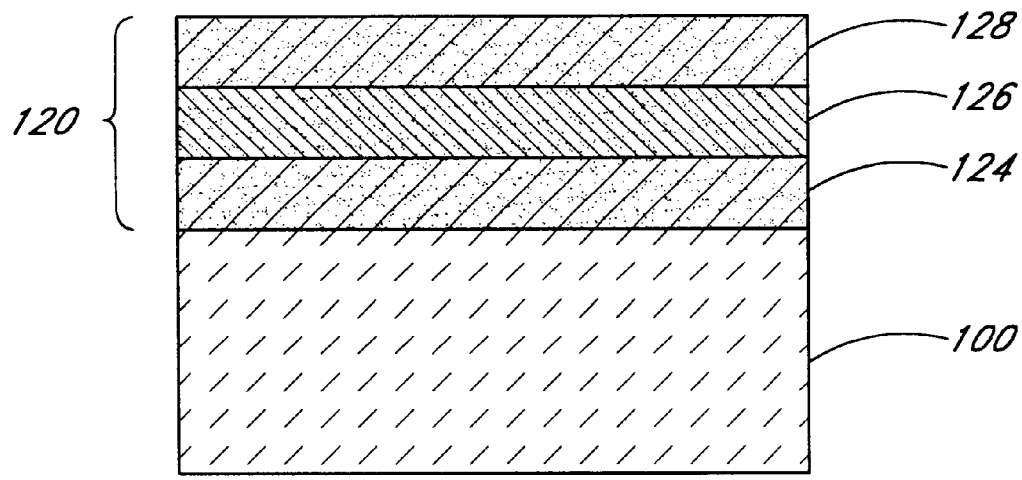
FIG. 1 is a cross sectional view of a substrate with layers that form a waveguide deposited thereon.

As shown in FIG. 1, an integrated planar Bragg grating comprises a substrate 100 and a planar waveguide 120. The substrate 100 comprises a negative expansion material, i.e., the substrate has a negative thermal coefficient of expansion. Preferably, the substrate 100 is polished on its top face and comprises a glass ceramic material such as lithium-aluminosilicate (e.g., beta eucryptite). The substrate 100 may advantageously comprise an amorphous material. The waveguide 120 is formed on top of the substrate 100 by alternately depositing material on the substrate and relieving stress within the deposited material. In the embodiment disclosed, the waveguide comprises a cladding layer 124 which is formed by depositing a series of thin layers on the substrate. For example, a thin film of silica having a thickness of 0.1 micron may be deposited on the substrate 100, followed by an annealing cycle to relieve stress within the deposited thin film. Annealing the cladding layer 124 also tends to more securely bond the film to the substrate 100. The thin film may be annealed by heating it slowly to 800° C., e.g., at a ramp rate of 20° C./hour, and then keeping the temperature constant at 800° C. for 30 minutes. Following the annealing of the thin film, more material may be deposited to bring the total thickness of the cladding to 1 micron. This 1 micron layer may be annealed, and the total thickness increased through further deposition to 2 microns, followed by another annealing cycle. In this way, the cladding layer 124 may be built up incrementally to a thickness of between 1 and 10 microns, and more preferably between 3 and 4 microns. Depositing as much as 2 microns of material in one cycle may lead to cracking, however. The deposition processes discussed herein may advantageously include a sputtering process, or may include one of a number of other processes, such as physical vapor deposition (PVD), plasma enhanced chemical vapor deposition (PECVD), sol-gel, or flame hydrolysis deposition (FHD). By selecting the appropriate deposition temperature, the level of stress within the deposited material can be controlled.

After forming the cladding layer 124, a core layer 126 may then be deposited on the cladding layer 124 in a manner analogous to the cladding layer deposition process described above, with thin layers of material being alternately deposited and annealed. The core layer 126 may be built up incrementally to a thickness of between 1 and 8 microns, and more preferably between 2 and 3 microns. Altogether, the total number of deposition and annealing cycles for forming the waveguide 120 is preferably no more than 4. The core layer 126 may be germanium doped silica, although one or more other dopants may be used in place of germanium or in addition to it, such as boron (B), tin (Sn), phosphorous (P), lead (Pb), and rare earths such as erbium (Er), ytterbium (Yb), neodymium (Nd), praseodymium (Pr), and cerium (Ce). The dopant concentration is preferably between 1 and 20 mole-%, and more preferably between 3 and 10 mole-%. Generally, as long as the dopant concentration is less than 8–9 mole-%, the thermal coefficient of expansion mismatch between the core layer 126 and the cladding layer 124 should not lead to cracking between these two layers. The core layer 126 has an index of refraction that is higher than that of the cladding layer 124, so that light propagating through the core layer will be confined therein through total internal reflection.

Figure 2:
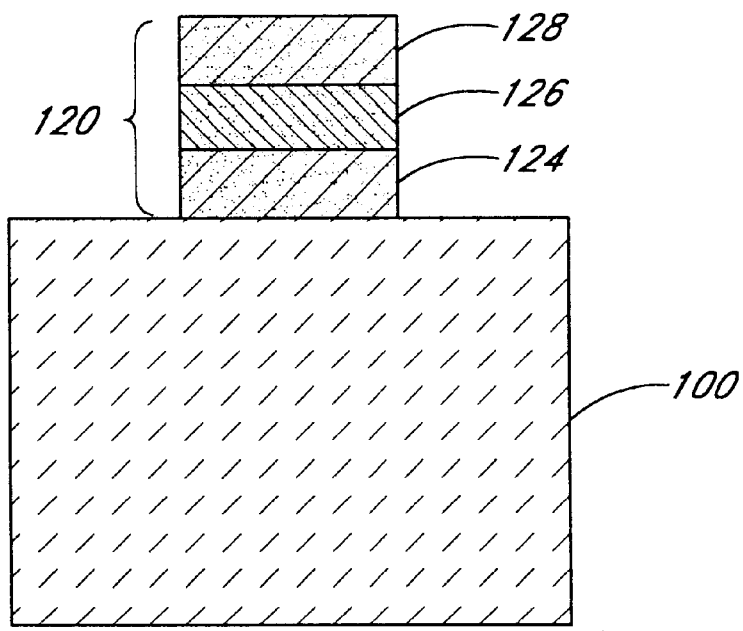
FIG. 2 is an end view of a waveguide on the substrate.
Figure 3:
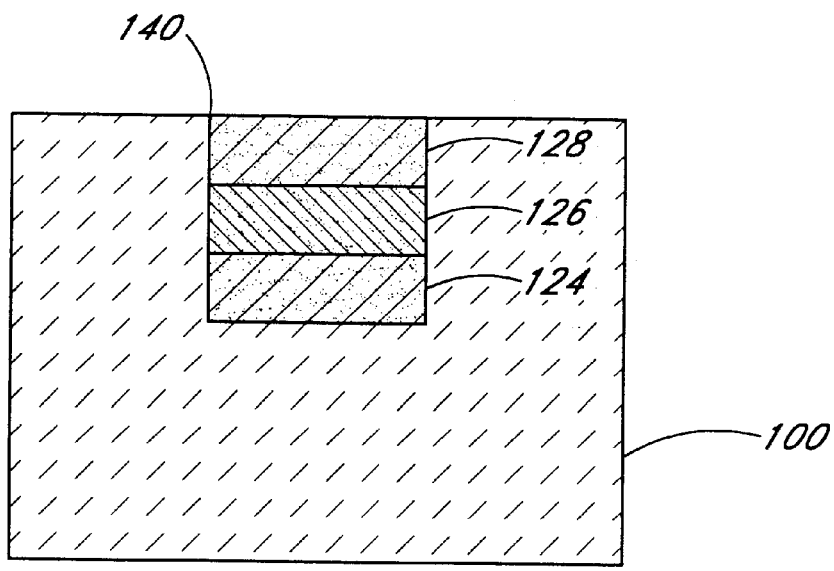
FIG. 3 is an end view of an alternative embodiment in which a waveguide resides within a groove in a substrate.

An optional additional cladding layer 128 (e.g., silica) may be deposited on top of the core layer 126, so that the core layer is sandwiched between two cladding layers 124 and 128. This approach offers more protection to the top of the core 126. However, even in the absence of a top cladding layer 128, light will be confined to the core layer 126 if the device is surrounded by air, since the index of refraction of air is nearly 1 (and therefore less than the index of refraction of the core layer 126). The cladding layer 124, the core layer 126, and the optional cladding layer 128 may be deposited in the presence of one or more masks (not shown) so that a narrow, planar waveguide 120 is formed on the substrate 100. If a mask is not used, then it may be necessary to etch away portions of the layers 124, 126, and 128 to form a waveguide of the desired width, as illustrated in the end view of FIG. 2. Also, the cladding layer 124, the core layer 126, and the optional cladding layer 128 may be formed directly in a groove 140 within the substrate 100, as illustrated in FIG. 3.

Figure 4:
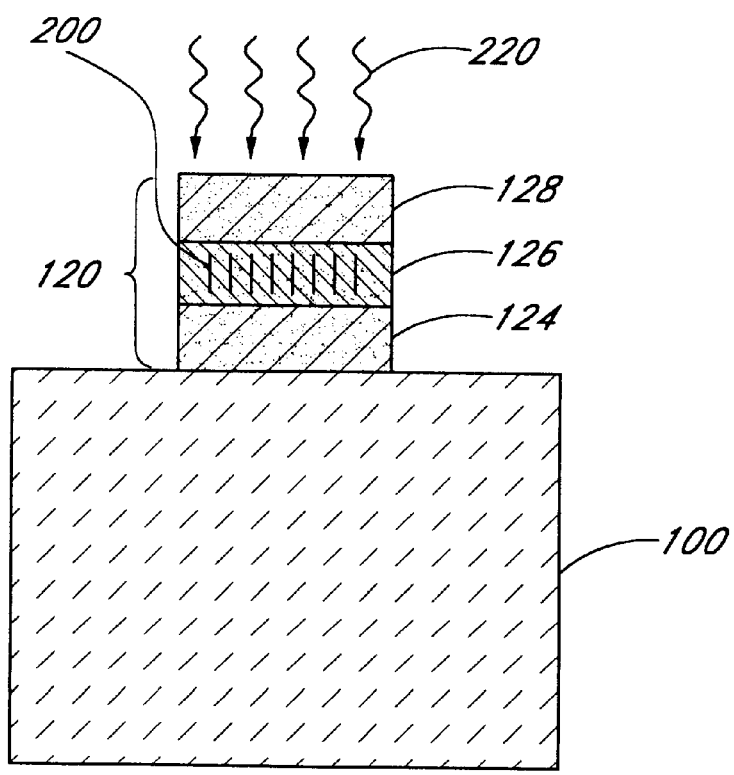
FIG. 4 illustrates the formation of a grating within the core layer of a waveguide by exposing the core layer to ultraviolet radiation.

As shown in FIG. 4, after the waveguide 120 is fabricated, a Bragg grating 200 may be formed therein by exposing the waveguide to ultraviolet light 220. This UV exposure induces refractive index changes in the core layer 126, thereby "writing" a Bragg grating into the waveguide 120. This photosensitive effect may be advantageously enhanced by first subjecting the waveguide 120 (in particular, the core layer 126) to a hydrogen treatment. In this technique, the waveguide 120 is exposed to high pressure hydrogen gas at low temperatures (e.g., room temperature), or alternatively, low pressure hydrogen gas at high temperatures (e.g., 500° C.). This treatment results in hydrogen being absorbed into the silica structure, which makes it easier to write a grating into the waveguide 120. After a grating has been written into the waveguide 120, the absorbed hydrogen may be liberated from the waveguide by heating the waveguide.

Although the core layer 126 and the cladding layer(s) 124 (and 128) within the waveguide 120 preferably have nominally have the same coefficient of thermal expansion, the waveguide 120 and the substrate 100 have a coefficient of expansion mismatch that is selected to substantially compensate for shifts in the peak reflection wavelength of the Bragg grating that would otherwise arise from changes in temperature. As the temperature of the waveguide 120 increases, the mechanical tension between the waveguide 120 and the substrate 100 is relieved such that the peak reflection wavelength is held nearly constant. To accomplish this, the coefficient of expansion mismatch between the substrate 100 and the waveguide 120 is preferably greater than about 4 ppm/° C., is more preferably greater than about 5 ppm/° C., and in one embodiment is greater than about 7 ppm/° C. The device is thus an integrated planar Bragg grating having a peak reflection wavelength that is substantially insensitive to variations in temperature.

Depending upon the grating length required and the size of the substrate 100, it may be advantageous to form multiple gratings into a single waveguide or into respective waveguides in the same substrate, keeping in mind the constraints imposed by cross talk. Through etching or the use of a mask, couplers and gratings may be fabricated within the same substrate to form a compact, planar WDM filter (not shown).

It should be understood that the scope of the present invention is not limited by the illustrations or the foregoing description thereof, and that certain variations and modifications of the foregoing embodiments will suggest themselves to one of ordinary skill in the art.

What is claimed is:

1. A method for forming an integrated Bragg grating for use in an environment having a temperature which changes, said method comprising the steps performed either sequentially or non-sequentially of:

provided a negative expansion substrate;

forming a waveguide on said negative expansion substrate by alternately depositing a material on said negative expansion substrate and relieving stress within said material; and forming a Bragg grating in said waveguide, said Bragg grating having a peak reflection wavelength, wherein said waveguide and said negative expansion substrate have a coefficient of expansion mismatch that is selected to substantially compensate for shifts in said peak reflection wavelength that would otherwise arise from changes in the temperature.

2. The method of claim 1 wherein relieving stress comprises the step of:

annealing the material.

3. The method of claim 2 wherein no more than four cycles of depositing and annealing are performed.

4. The method of claim 1 wherein the step of forming the waveguide further comprises the steps of:

forming a cladding layer on the negative expansion substrate by alternately depositing a first material on the negative expansion substrate and annealing said first material, said cladding layer having an index of refraction; and forming a core layer on said cladding layer by alternately depositing a second material on said cladding layer and annealing said second material, wherein said core layer has an index of refraction that is higher than said index of refraction of said cladding layer.

5. The method of claim 4 further comprising the step of:
forming an additional cladding layer on the core layer, so that the core layer is sandwiched between the cladding layer and said additional cladding layer.

6. The method of claim 4 wherein the core layer includes germanium-doped silica.

7. The method of claim 6 wherein the core layer includes at least one dopant selected from the group consisting of B, Sn, Al, P, Pb, Er, Yb, Nd, Pr, or Ce.

8. The method of claim 4 wherein the core layer includes at least one dopant selected from the group consisting of B, Sn, Al, P, Pb, Er, Yb, Nd, Pr, or Ce.

9. The method of claim 4 wherein the core layer has a thickness between about 1 micron and about 8 microns.

10. The method of claim 4 wherein the core layer has a thickness between about 2 microns and about 3 microns.

11. The method of claim 4 wherein the cladding layer has a thickness between about 1 micron and about 10 microns.

12. The method of claim 4 wherein the cladding layer has a thickness between about 3 microns and about 4 microns.

13. The method of claim 4 wherein the cladding layer includes silica.

14. The method of claim 1 wherein the coefficient of expansion mismatch is greater than about 4 ppm/° C.

15. The method of claim 1 wherein the coefficient of expansion mismatch is greater than about 5 ppm/° C.

16. The method of claim 1 wherein the coefficient of expansion mismatch is greater than about 7 ppm/° C.

17. The method of claim 1 wherein the step of forming the waveguide comprises:
a sputtering process.

18. The method of claim 1 wherein the step of forming the waveguide includes a deposition process selected from a group of processes consisting of physical vapor deposition (PVD), plasma enhanced chemical vapor deposition (PECVD), sol-gel, or flame hydrolysis deposition (FHD).

19. The method of claim 1 wherein the negative expansion substrate is polished.

20. The method of claim 1 wherein the negative expansion substrate is a glass-ceramic.

21. The method of claim 1 wherein the negative expansion substrate is amorphous.

22. The method of claim 1 wherein the negative expansion substrate includes lithium-alumino-silicate.

23. The method of claim 1 wherein the negative expansion substrate includes beta eucryptite.

24. The method of claim 1 wherein the step of forming the Bragg grating comprises:
writing the Bragg grating into the waveguide with ultraviolet light.

25. The method of claim 24 wherein the step of writing the Bragg grating further comprises the step of:
treating the waveguide with hydrogen prior to the writing.

26. The method of claim 1 further comprising the step of:
etching away portions of the material deposited on the negative expansion substrate to form the waveguide.

27. The method of claim 1 further comprising the step of:
using a mask to direct the material onto the negative expansion substrate in the form of the waveguide.

28. An integrated planar Bragg grating for use in an environment having a temperature which changes, the integrated planar Bragg grating comprising:
a negative expansion substrate having an index of refraction; and
a core layer disposed on the negative expansion substrate, said core layer having an index of refraction higher than the index of refraction of the negative expansion substrate, and a thickness between about 1 micron and 10 microns, at least a portion of the core layer defining a planar waveguide having a Bragg grating therein, said Bragg grating having a peak reflection wavelength, the planar waveguide overlying and being in mechanical tension with the negative expansion substrate, wherein there is a coefficient of expansion mismatch between the planar waveguide and the negative expansion substrate greater than about 4 ppm/° C. and selected to substantially compensate for shifts in the peak reflection wavelength arising from changes in the temperature.

29. The integrated planar Bragg grating of claim 28 wherein the negative expansion substrate further comprises:
a cladding layer disposed so as to be in contact with the core layer, the cladding layer having an index of refraction lower than the index of refraction of the core layer.

30. The integrated planar Bragg grating of claim 29 further comprising:
an additional cladding layer that overlies the core layer.

31. The integrated planar Bragg grating of claim 28 wherein the cladding layer has a thickness between about 3 microns and about 4 microns.

32. The integrated planar Bragg grating of claim 28 wherein the core layer has a thickness between about 1 micron and about 8 microns.

33. The integrated planar Bragg grating of claim 28 wherein the core layer has a thickness between about 2 microns and about 3 microns.

34. The integrated planar Bragg grating of claim 28 wherein the core layer is germanium-doped silica.

35. The integrated planar Bragg grating of claim 34 wherein the core layer includes at least one dopant selected from the group consisting of B, Sn, Al, Pb, Er, Yb, Nd, Pr, or Ce.

36. The integrated planar Bragg grating of claim 28 wherein the core layer includes at least one dopant selected from the group consisting of B, Sn, Al, P, Pb, Er, Yb, Nd, Pr, or Ce.

37. The integrated planar Bragg grating of claim 28 wherein the negative expansion substrate is beta eucryptite.

38. The integrated planar Bragg grating of claim 28 wherein the planar waveguide is silica.

39. The integrated planar Bragg grating of claim 28 wherein the coefficient of expansion mismatch between the planar waveguide and the negative expansion substrate is greater than about 5 ppm/° C.

40. The integrated planar Bragg grating of claim 28 wherein the coefficient of expansion mismatch between the planar waveguide and the negative expansion substrate is greater than about 7 ppm/° C.

41. The integrated planar Bragg grating of claim 28 wherein the negative expansion substrate defines a groove in which at least a portion of the planar waveguide is disposed.

* * * * *